US007984371B2

(12) United States Patent
Zdenek

(10) Patent No.: US 7,984,371 B2
(45) Date of Patent: Jul. 19, 2011

(54) METHOD AND SYSTEM FOR THE GRAPHICAL MODELING OF DATA AND CALCULATIONS OF A SPREADSHEET

(76) Inventor: Andrew Joseph Zdenek, Robbinsville, NJ (US)

( * ) Notice: Subject to any disclaimer, the term of this patent is extended or adjusted under 35 U.S.C. 154(b) by 1164 days.

(21) Appl. No.: 11/368,740

(22) Filed: Mar. 6, 2006

(65) Prior Publication Data

US 2007/0033519 A1 Feb. 8, 2007

Related U.S. Application Data

(60) Provisional application No. 60/654,641, filed on Feb. 18, 2005, provisional application No. 60/705,888, filed on Aug. 5, 2005.

(51) Int. Cl.
*G06F 17/00* (2006.01)
*G06F 7/00* (2006.01)

(52) U.S. Cl. ........ 715/212; 715/215; 715/234; 715/255; 715/761; 707/778; 707/805

(58) Field of Classification Search .................. 715/212, 715/213, 215, 217, 219, 220, 234, 254, 255, 715/256, 267, 700, 200, 205, 206, 209, 210, 715/226, 229, 231, 253, 273, 731, 760, 762, 715/853, 854, 860, 962, 967, 968; 707/1, 707/4, 100, 101
See application file for complete search history.

(56) References Cited

U.S. PATENT DOCUMENTS

| | | | | |
|---|---|---|---|---|
| 5,603,021 | A * | 2/1997 | Spencer et al. | 707/4 |
| 5,880,742 | A * | 3/1999 | Rao et al. | 345/440 |
| 5,987,481 | A * | 11/1999 | Michelman et al. | 715/219 |
| 2002/0099743 | A1* | 7/2002 | Workman et al. | 707/530 |
| 2006/0085386 | A1* | 4/2006 | Thanu et al. | 707/2 |

OTHER PUBLICATIONS

Smedley et al., "Expanding the Utility of Spreadsheets Through the Integration of Visual Programming and User Interface Objects", ACM, 1996, pp. 148-155.*
Jones et al., "A User-Centred Approach to Functions in Excel", ACM, Aug. 2003, pp. 165-176.*

* cited by examiner

*Primary Examiner* — Maikhanh Nguyen

(57) ABSTRACT

A method and system for the graphical modeling of calculations in a spreadsheet that provides a graphical representation of formulas and data contained in a spreadsheet. The graphical representation consists of nodes and edges connected in a tree or graph structure. The nodes represent operators and operands of a formula and are arranged in an expression hierarchy based on operational precedence. Formulas containing cell references are represented through a compound expression hierarchy consisting of an expression hierarchy that includes a descendant expression hierarchy representing the contents of each referenced cell. Expression hierarchies that share similar nodes can be represented through a shared graphical representation to reduce the number of items displayed concurrently within a view and to simplify multiple formula edits. The expression hierarchies and the formulas they represent are kept consistent so that changes made to either can be reflected in both the spreadsheet and graphical representation.

12 Claims, 17 Drawing Sheets

Example of formula building with dynamic content trees

Two seperate dynamic content trees

User "drags and drops" a root node to combine

The user selects the desired operator from the toolbox and sets the oupt cell. A new tree is then formed and a new corresponding formula is added to the output cell.

(2+((A5+2)*4)-(C2*(2+4)))

Example of formula building with static range nodes

Two seperate static range nodes

Unknown
Cell: B4
Val: 7

Unknown
Cell: A1
Val: 5

User "drags and drops" a root node to combine

The user selects the desired operator from the toolbox and sets the oupt cell. A new tree is then formed and a new corresponding formula is added to the output cell.

Unknown
Cell: F1
Val: 28
Template
{Ref1}
{Val1}
{Val2}
Original tree
Resulting tree
Alternative resulting tree
Based on user selection of less restrictive compression settings Original tree
Intermediate compression step
(To illustrate compression process)
Resulting tree Unknown
Cell: E1
Val: 36
SUM
A1
B1
C1
D1
1
2
3
4
7
8
Original tree Unknown
Cell: E1
Val: 36
SUM
Template
[Val1]
[Val2]
Resulting tree

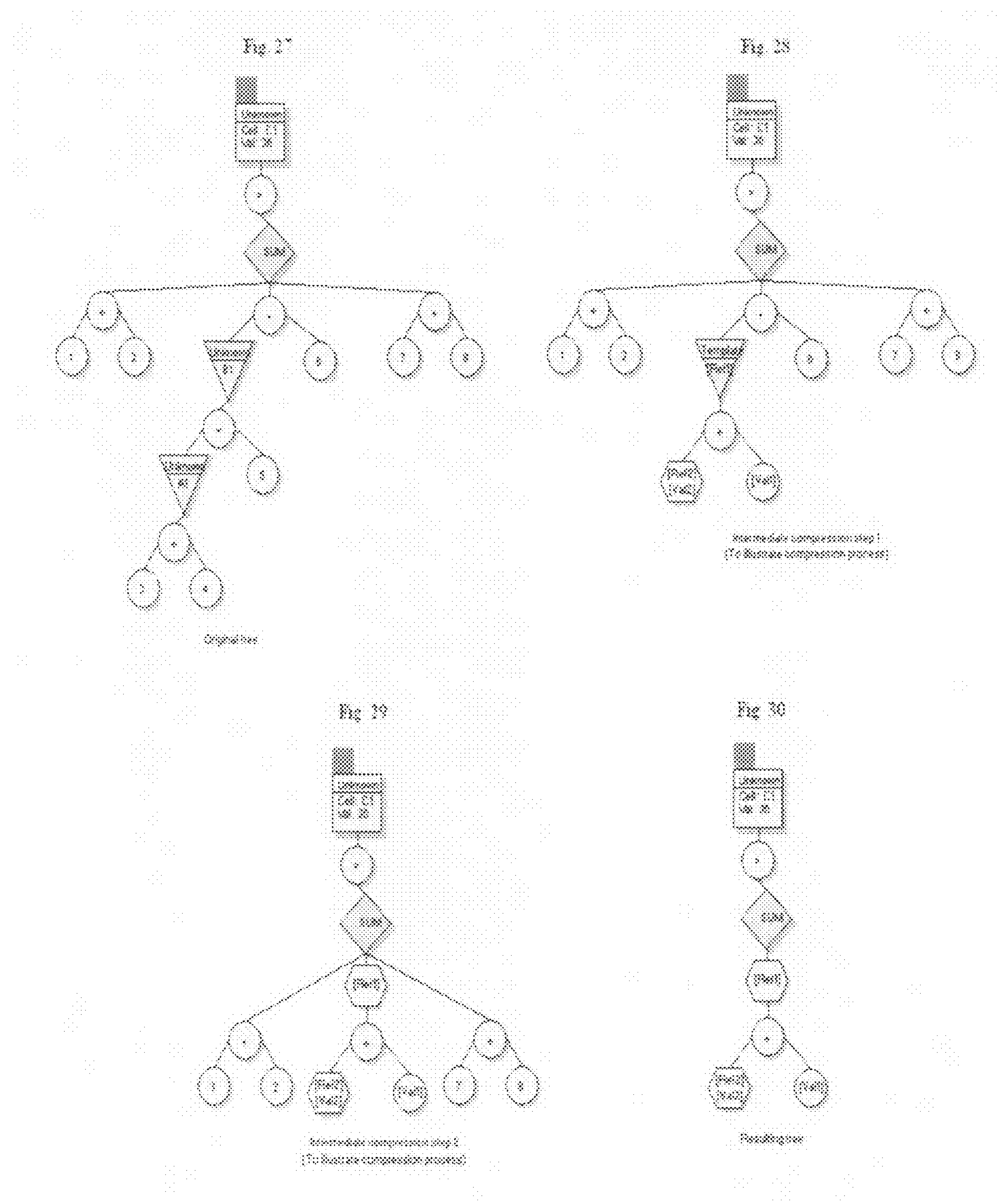

METHOD AND SYSTEM FOR THE GRAPHICAL MODELING OF DATA AND CALCULATIONS OF A SPREADSHEET

CROSS-REFERENCE TO RELATED APPLICATIONS

Provisional Patent Application: 60/654,641 Filed: Feb. 18, 2005

Provisional Patent Application: 60/705,888 Filed: Aug. 5, 2005

FEDERALLY SPONSORED RESEARCH

Not Applicable

SEQUENCE LISTING

Not Applicable

BACKGROUND

1. Field of the Invention

The present invention relates to computer based calculations and more specifically those performed by programs commonly known as "spreadsheets". Spreadsheets provide a system for arranging sets of calculations and data within an organized layout. Spreadsheets are comprised of a series of horizontal and vertically aligned adjacent regions referred to as cells. Within these cells a user can enter formulas consisting of a series of operators and operands in infix notation. Once the formula is entered into a cell the spreadsheet program can be set to perform the calculation and display the results within the cell containing the formula. The formulas can also be built with interdependency in which one formula references the contents of a separate cell which can contain data or another formula. When the referenced cell contains another formula the results from that formula are used as a component of the calculation being preformed by the referring formula.

Spreadsheet programs provide an efficient tool for performing calculations. However, within such a system the user has no direct means of knowing whether referenced cells contain constant values—and if so what they might be—or if they are the result of further calculations taking place elsewhere from within a separate formula contained in the referenced cell. The problem is compounded by the fact the formulas are often not clearly viewed all at once; since they can be spread throughout cell locations and even found in entirely separate screen views and files. The present invention proposes a means of assisting the user with managing spreadsheets by providing a graphical representation of the calculations contained in the cells.

2. Description of the Related Art

There are existing processes which define how to create a graphical representation of spreadsheet formulas such as Spencer at el. (U.S. Pat. No. 5,603,021 issued Feb. 11, 1997). Spencer's methods translate spreadsheet formula notation into graphical hierarchies to assist in data entry. Within Spencer's process a referenced cell contained in a formula is displayed as a reference node within the formulas graphical representation. This provides a simple view of a formula that is useful to assist in data entry. However, the present invention takes a novel approach by creating new compound expressions which appends the expression hierarchy of a referenced cell as a descendant within the expression hierarchy of the original formula containing the reference. This process is carried out for each newly appended descendant expression until no further references are present. Such a process creates complex structures that display the complete flow of calculation across separately located formulas. This provides a new way to view the underlying behavior between formulas that governs the final results displayed in the spreadsheet.

There are also existing processes used to compare formulas for similarities so they can be associated in groups used to support such features as auto completion during data entry and locating inconsistent formulas within a contiguous range of cells. However, the present invention employs the process of building compound expressions. When the methods of the prior art compare formulas for equivalency they are concerned with the immediate structure of the formula within an individual cell and group based on that structure. However, the present invention is combining the expressions of a referring formula together with the expressions of any referenced formulas and comparing these compound expressions for equivalency. These two distinct approaches will produce entirely separate results. For example in FIG. 30 the formulas in cells A1, B1, and C1 all share a similar structure and would be considered equivalent by the prior art. However, since the present invention is appending the expression hierarchies representing the contents of the referenced cells the newly formed compound expressions are no longer equivalent and would not be grouped as such.

Since compound expressions are built from a hierarchy of two or more separate referenced expressions, each descendant expression contained within in a compound expression is also compared for similarity. Within a compound expression a distinct instance of each referenced expression is appended as a descendant expression of each node that references its containing formula's cell to form the full compound expression hierarchy. Therefore, in the context of a compound expression a distinct grouping of the descendant expressions exists for each set of similar descendant expressions that are referenced by a common reference node or a successive set of descending reference nodes within the compound expression hierarchy. The building of such shared expression groups within a compound expression is further illustrated in FIGS. 13 through 30. These expression groups can not be realized through the methods of the prior art and require the exhaustive reference linking of the compound expression building process provided by the present invention.

BRIEF SUMMARY OF THE INVENTION

The present invention provides a means to gather and convert the formulas and data contained within a spreadsheet into graphical representations. The graphical representations consist of nodes and edges connected in a tree or graph structure. The nodes represent the operators and operands of the formula and are arranged according to operational precedence within an expression hierarchy. The nodes and edges of each expression hierarchy can be rendered as various shapes within a view or display. If a formula contains a reference to a separate cell the contents of the referenced cell are included in the expression hierarchy of each referring formula's expression hierarchy to create a compound expression hierarchy. The present invention allows the user to view a plurality of such expression hierarchies and compound expression hierarchies concurrently within a view to obtain a comprehensive model of the system. Displaying several expression hierarchies concurrently within a view can produce a large number of images within the display. To create a more efficient graphical model, the present invention reduces the number of images displayed at a time by combining redundant sets of nodes shared between or within expressions and compound expressions into one shared expression. The present invention can keep both the graphical representation and textual representations functionally equivalent by translating changes made to one into the appropriate changes to the data defining the other. In doing so, the present invention effectively provides a graphical interface for working with formulas within a spreadsheet.

BRIEF DESCRIPTION OF DRAWINGS

FIG. 27: Shows an intermediate step of the compression process for the compound expression hierarchy in FIG. 25.

FIG. 28: Shows the expression hierarchy resulting from the compression of the compound expression hierarchy in FIG. 25.

FIG. 29: Shows an individual expression hierarchy within a view having two compound expression hierarchies that have the individual expression hierarchy as a descendant expression.

FIG. 30: Shows three compound expressions that have different structure in their descendant expressions at some point in the overall expression hierarchy.

DETAILED DESCRIPTION OF THE INVENTION

The preferred embodiment of the present invention consists of computer software. As such, the software can be highlighted based on an overview of methods and processes.

The discovery method of the present invention relates to the process of gathering meaningful information from a spreadsheet. This is accomplished via a link to the spreadsheet application or an associated spreadsheet file. Such links are commonly implemented through information sharing routines of computer software and are well known to those familiar with the art. The present invention could also be embodied as a component of the spreadsheet application itself. In the second embodiment the link can be considered an internal routine of the spreadsheet application. Determining the desired sections of a spreadsheet to gather source data from may be accomplished through user selection from a list of available sources. Available sources may consist of an area, range or entire sheet within a spreadsheet or several separate spreadsheet files. Once a link to a data source has been established information is gathered from the spreadsheet to produce a graphical model.

Figures 1, 2:
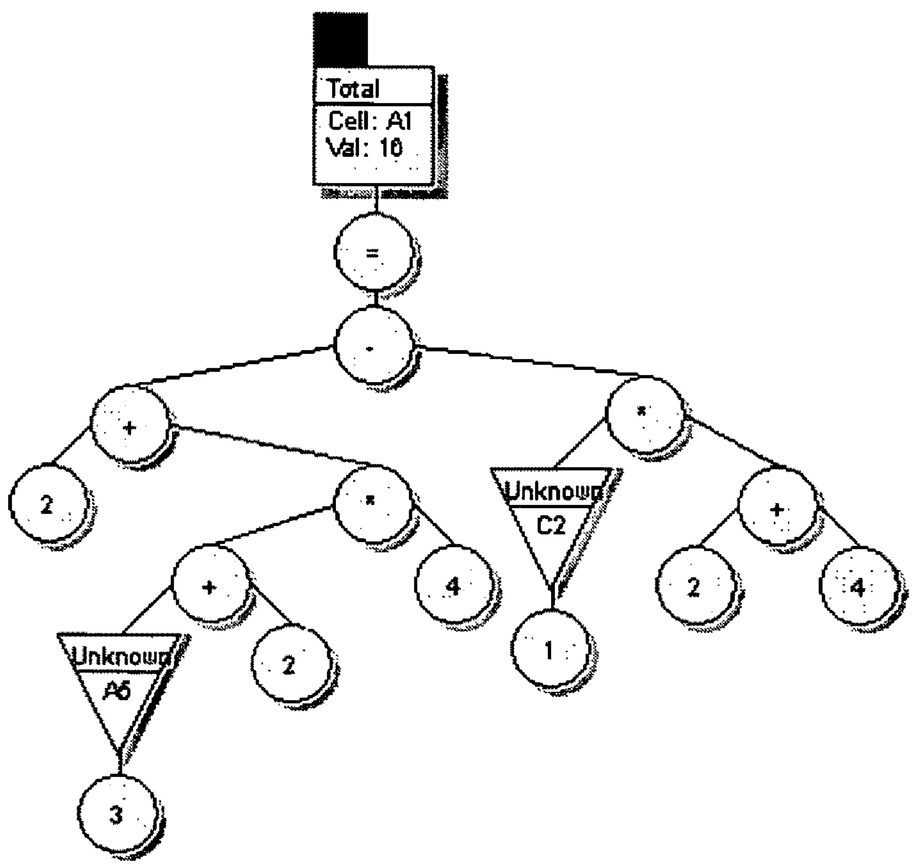
FIG. 1: Is an example of an expression hierarchy produced by the present invention based on the formula shown in textual notation in FIG. 2.
FIG. 2: Is an example of a formula expressed in the text based infix notation commonly used within a spreadsheet.

All formulas and references contained in the spreadsheet cells are retrieved from the source and displayed as graphical structures referred to as expression hierarchies as shown in FIG. 1. FIG. 1 depicts the graphical view of the expression hierarchy that represents the formula shown in infix notation in FIG. 2. In FIG. 1 the rectangular node at the top is called a root node and displays information concerning the cell that contains the formula. The other nodes within an expression hierarchy represent computational operators and operands. These nodes can use physical properties such as shape, size and color to indicate the intent or functionality of their contents.

Figure 3:
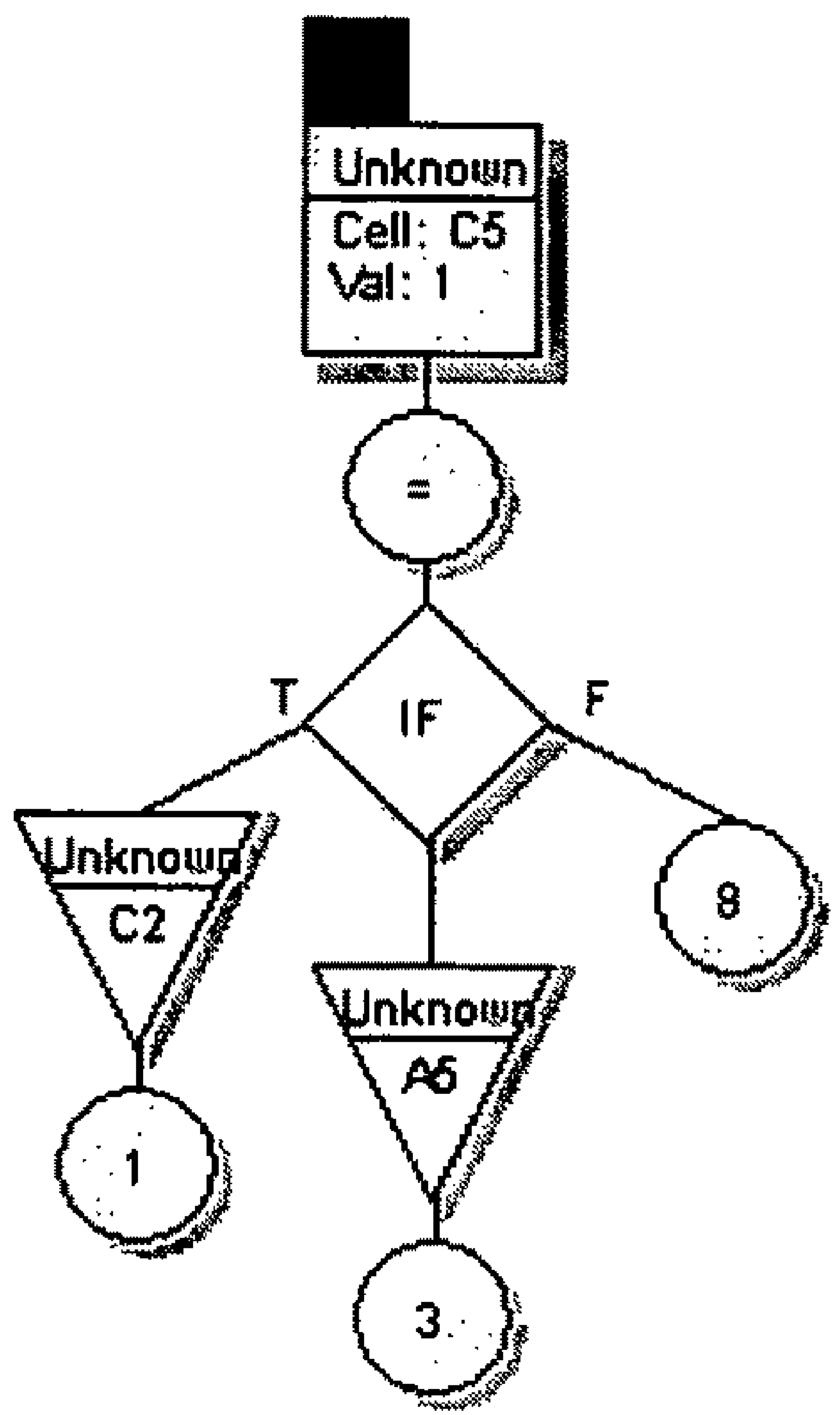
FIG. 3: Shows an example of an expression hierarchy produced by the present invention based on the spreadsheet formula IF(1,2,3).
Figure 5:
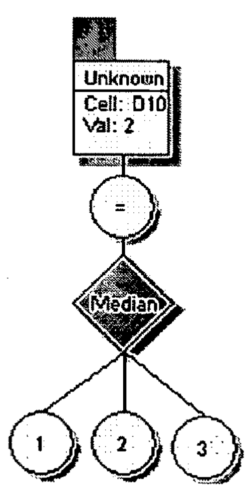
FIG. 5: Shows an example of an expression hierarchy produced by the present invention from a formula containing a function. In this case the function is MEDIAN(1,2,3) which finds the median value of the given input values of (1,2, and 3).
Figure 7:
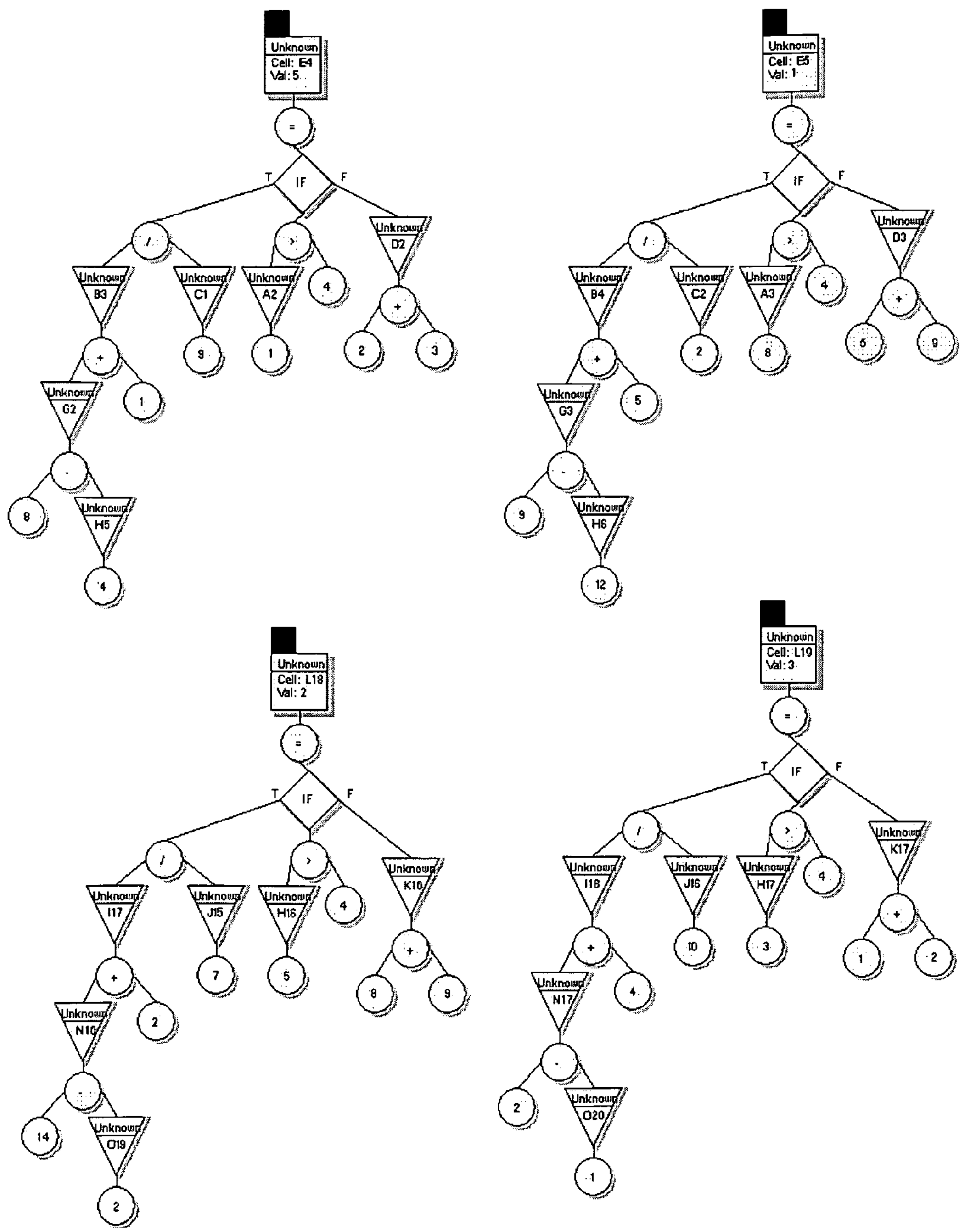
FIG. 7: Shows a collection of expression hierarchies produced by the present invention from several separate formulas which all share a similar computational structure.
Figure 8:
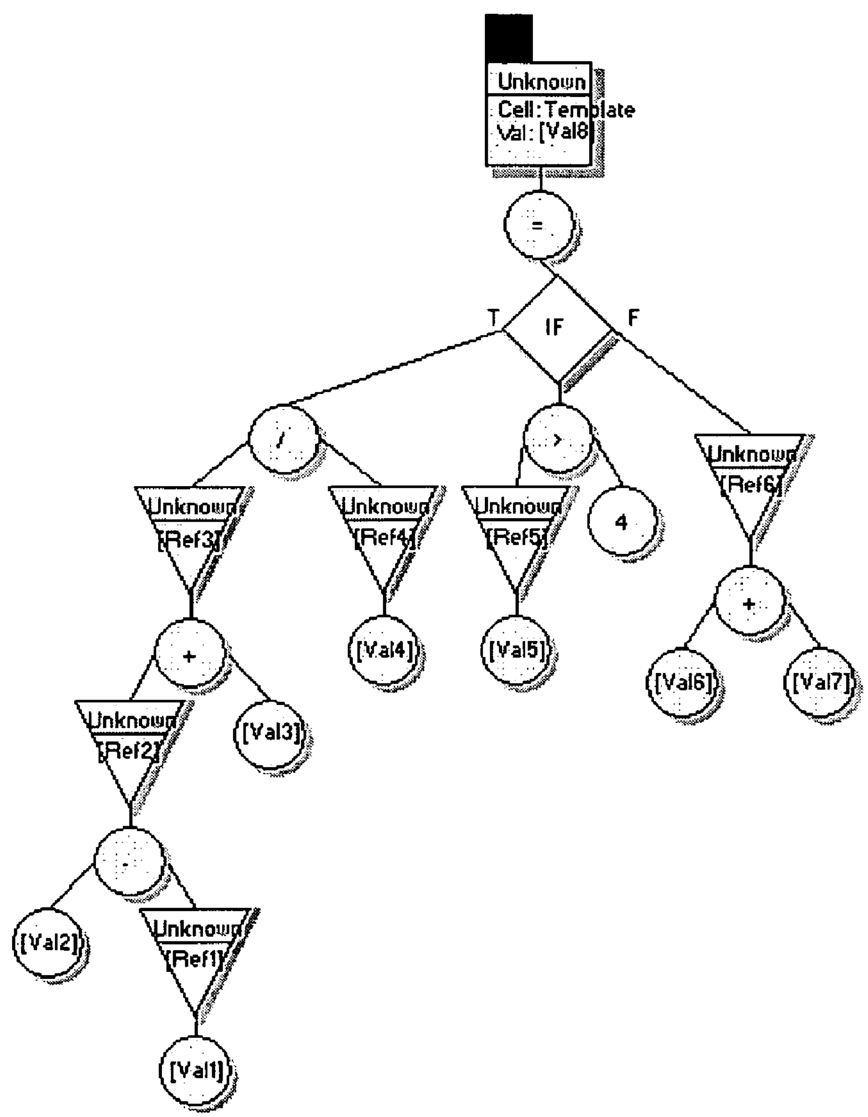
FIG. 8: Shows a shared expression hierarchy produced by the present invention for the expression hierarchies and underlying formulas of FIG. 7.

The present invention can represent basic calculations contained in formulas such as in FIG. 1 and also more complex relationships such as those created through combining functions and arithmetic within formulas. For the purpose of the present invention a cell that contains only a function is also considered a formula. Functions are commonly used by spreadsheets to provide decisional behavior or perform more complex computations based on provided input. In the expression hierarchy of FIG. 3 the simple function IF(1,2,3) is represented. The native spreadsheet syntax of IF(1,2,3) is interpreted as follows—The first input operator is the condition, the second is the output if the condition is true, and the third is the output if the condition is false. In FIG. 3 the expression hierarchy properly depicts the logical branching conditions of the function within the formula. The representation is not only limited to decisional functions but can also depict any function or operator with single or multi parameter based input. FIG. 5 shows a expression hierarchy which represents a formula containing a computational function MEDIAN(1,2,3) which finds the median of the given input values—in this case the three values of 1,2, and 3.

Figure 4:
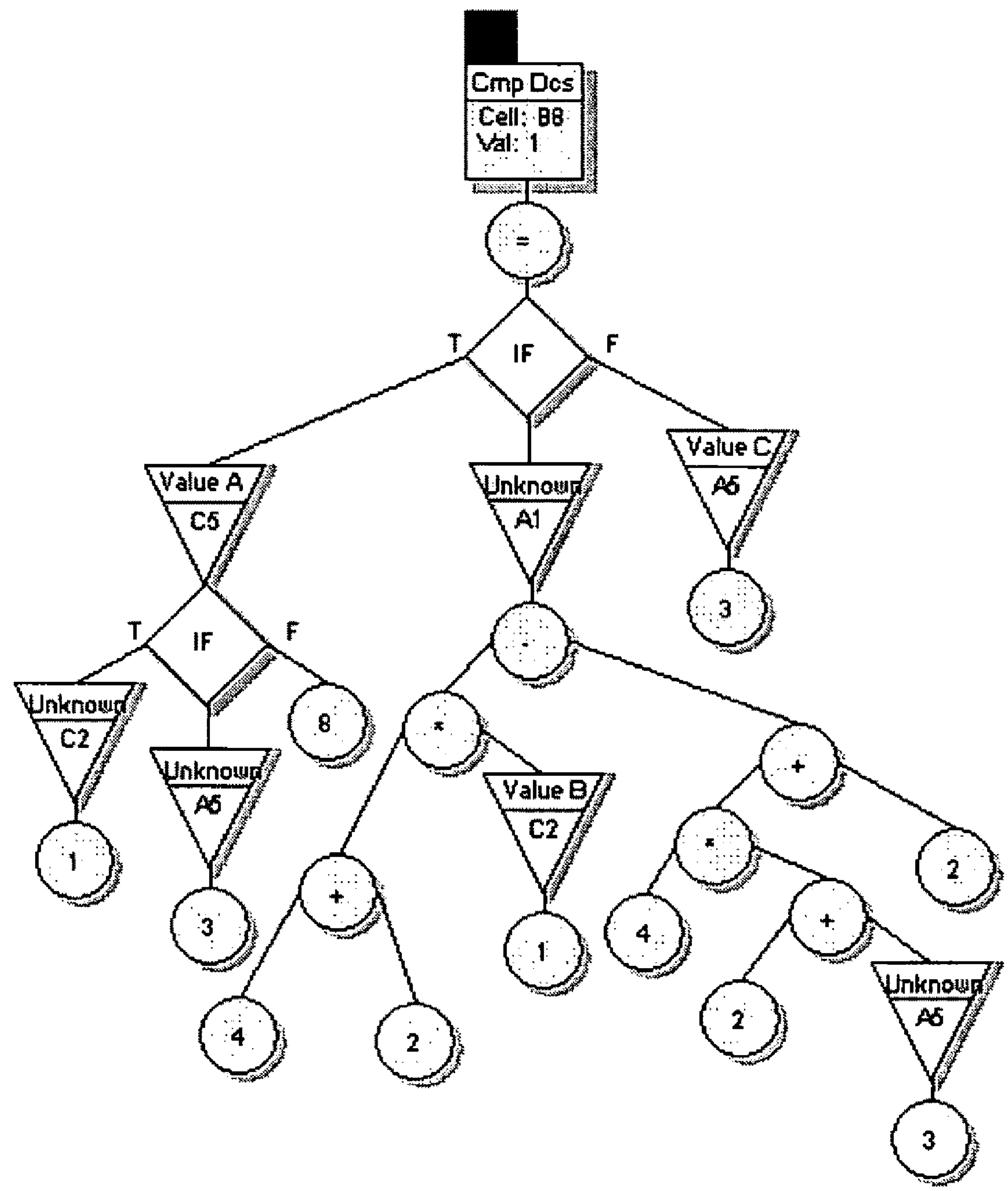
FIG. 4: Shows an example of a compound expression hierarchy produced by the presented invention, by combining the expression hierarchy representing a referenced cell formula with the expression hierarchy representing the original referring formula.

Many times one or more operands found in a formula are references to other cells. Sometimes these reference operands point to a cell or range of cells that contain a separate formula. In this case the present invention produces a compound expression hierarchy in which an expression hierarchy representing the referenced formula is appended as a descendant expression of the reference node within the referring formula's expression hierarchy. An example of such a compound expression is shown in FIG. 4. The cell references C5 and A1 in the expression hierarchy of FIG. 4 contain additional formulas—therefore expression hierarchies representing these formulas are appended as descendant expressions of the expression hierarchy representing the referencing formula found in cell B8. The present invention will display a graphical representation of a referenced formula as both an individual expression hierarchy and also as separate descendant expressions of each compound expression that represents a formula containing a reference to it. By providing a view into the broader relationships between formulas the user can see how each individual component within a compound expression hierarchy will influence the final output of the original formula. For the purposes of the present invention a cell containing only a reference to another cell is also considered a formula and would be represented by a compound expression hierarchy. Since a compound expression hierarchy is essentially an expression hierarchy containing a variable level of descendant expressions it can also be referred to as simply an expression hierarchy.

Figure 6:
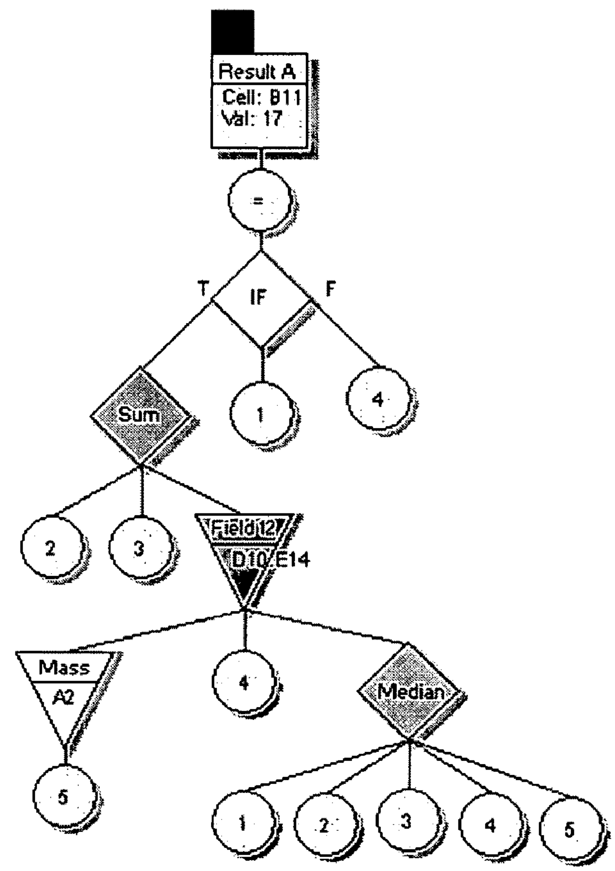
FIG. 6: Shows a compound expression hierarchy produced by the present invention to represent a formula with a variety of input nodes. The reference node labeled as Field 12 corresponds to an area reference which refers to a group of contiguous adjacent cells located between cell D10 and cell E14. As such, the compound expression's descendant expressions consist of any contents within the area. In this case, they consist of a reference, a value, and a function.

The expression hierarchy depicted in FIG. 6 represents a compound expression hierarchy with a variety of input nodes. Within the expression hierarchy there is a reference node labeled as Field 12. This reference node corresponds to an area reference which represents a group of contiguous adjacent cells. As such, the descendant expressions consist of any contents within the area. In this case, the contents of the area are a reference, a value, and a function. This type of view can easily become crowded with information if the area spans a large number of cells in the spreadsheet. For this reason, the user is able to select whether to show or hide all or certain descendant expressions of any type of reference node as appropriate for the current task. For instance, the user may hide all nodes or choice to view only those nodes which correspond to references, additional formulas, and/or specific data types.

Formulas within spreadsheets often share a common computational structure. One example is created a formula is copied and then pasted down a column or row. It is also possible that two or more formulas can be created separately and even be contained within non contiguous cell locations, but still share a common structure. In either case the present invention allows these formulas which share a common structure to be combined or compressed into one shared expression hierarchy which represents the calculations of all formulas in the set. This allows the user to view this structure only once and hide information which may be considered repetitive for certain purposes. Another added benefit is the ability to propagate a change made to the shared formula expression hierarchy across all the formulas associated with it. Once the user makes changes to this shared expression hierarchy they can choose to push or cascade these changes to all member expression hierarchies and formulas they represent. This is particularly useful since the present method of re-using a formula within an area consists of the following steps: change a formula, manually locate all similar formulas and then copy and paste the updated formula to all desired old formula cells. The last two steps of the present method are especially error prone and lead to inconsistent formula updating. An example of a collection of expression hierarchies sharing a common underlying structure is shown in FIGS. 7, 11, 13, 16, 19, 21, 23, and 25 along with their corresponding shared expression hierarchy shown in FIGS. 8, 12, 15, 18, 20, 22, 24, and 28 respectively.

The process involved with compressing expression hierarchies can consist of traversing the underlying data structures of two or more expression hierarchies or compound expression hierarchies and comparing properties of the nodes at similar points for equivalency. Algorithms for implementing the type of tree or graph traversal used to compare the nodes of two or more expression hierarchies are well known in the art. In the present embodiment the comparison process includes traversing two or more expression hierarchies and determining if the operator nodes located equal position within the hierarchy are equal. An embodiment may also apply additional rules to considering when grouping of formulas during compression. Such rules may include considering relative location or cell offset when grouping the formulas for compression.

The user can expand a compressed shared expression hierarchy to view the expression hierarchy of any or all of the individual formulas belonging to the group. By expanding a compressed shared expression hierarchy and exposing the member expression hierarchies, the user is also free to make changes to individual member expression hierarchies. If changes made to a member expression or its underlying formula remove the similarities that serve as the basis for including the formula in the shared group the expression would be excluded from the shared expression hierarchy.

The present invention also gathers information pertaining to input ranges. Input ranges consist of a group of individual cells or cell ranges which currently or may potentially contain data that can be used as input for formulas and functions. Input ranges can correspond to empty cells or cells with value based content. The process of creating input ranges may include automatic discover based on comparing cell properties or from receiving user input. The cell properties used for discovery may include the format of the cell, cell contents, or be based on contiguous cell locations. After an input range is established, the user may select to assign automatic expansion to the input range. By assigning the automatic expansion to an input range any cells which are later modified to match the input range grouping criteria will be included in the input range. Automatic expansion can be set by the user to consider cells that are contiguous or non-contiguous in relation to the original input range. An input range is depicted graphically as a single node representing all the cells belonging to the input range. Just as with other nodes, the input range nodes may use physical properties such as shape, size or color to denote data types, intent, or functionality of the underlying content.

Sometimes spreadsheets will contain links to data outside the file. This data may reside in a separate spreadsheet not identified in the source or even a database or web page. In this case, the present invention provides a display with information that allows the user to distinguish these sources within the nodes of an expression hierarchy or input range and quickly identify their origin. Such information may consist of nodes with a shape specifically designated for external links along with text describing the external source.

Synchronization is maintained between spreadsheet cells and the graphical representations after changes are made to either. This is accomplished through translating the changes made to an expression back to the infix equivalent and vice versa. Such methods for translating data between text and tree based structures are well known in the art. Updating of the cell and expression hierarchy is communicated using the same type of link described for gathering spreadsheet source data.

All nodes that represent cell locations such as an expression hierarchy's root node, a reference node or an input range's node can be assigned names. The present embodiment displays the names as text within the nodes that represent the named cells or range. If the name being assigned to a node is not already assigned to the underlying cells, the name can produce or update a named range residing within the spreadsheet as part of the synchronization process. By labeling the nodes and underlying spreadsheet cells with meaningful names the intent and purpose of the cell contents they represent is made clearer, making it easier to recognize the underlying spreadsheet structure. Assigning names for nodes can be accomplished by user input, gathering explicit names assigned to a cell or range from within the spreadsheet, or by scanning the spreadsheet to attempt to predict implicit naming of a cell based on neighboring cells with character type content. A variety of such name association methods are well known in the art.

Figure 9:
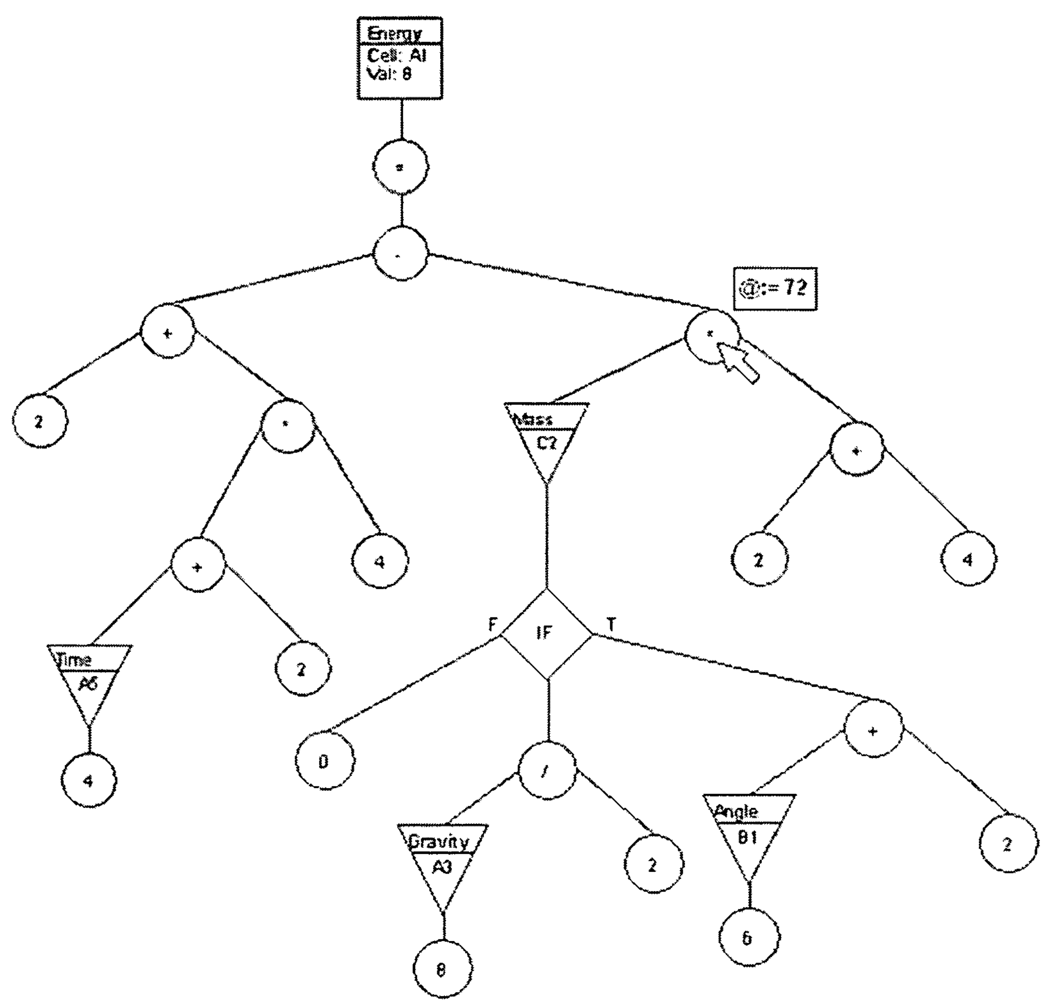
FIG. 9: Illustrates an example of building a formula using input ranges.
Figure 10:
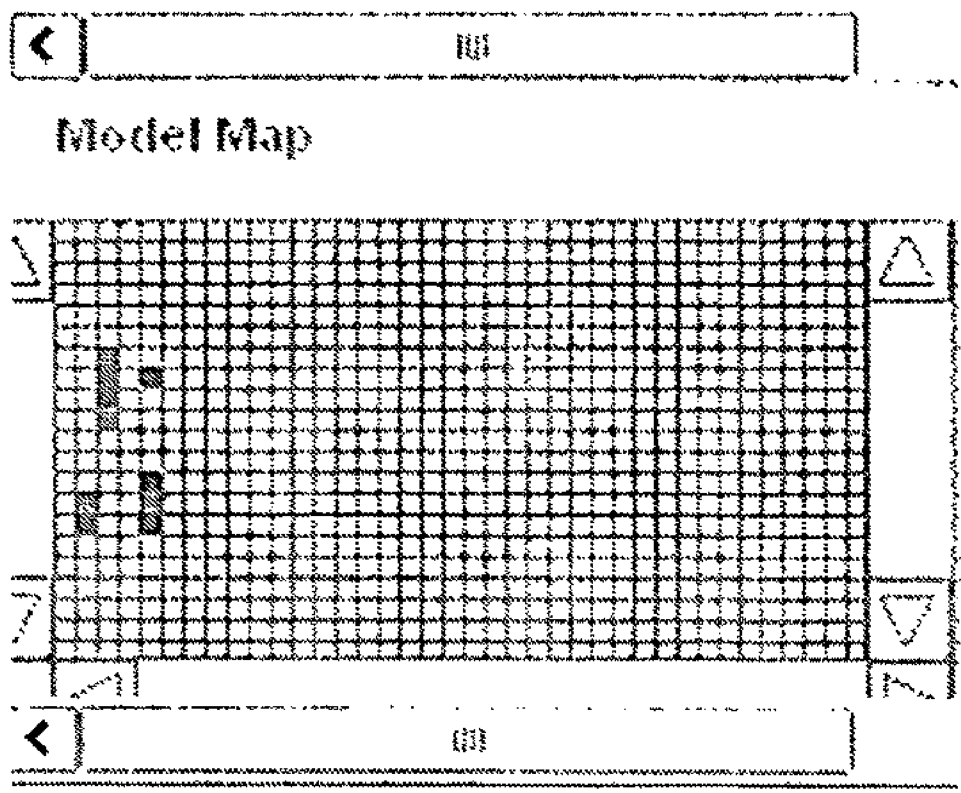
FIG. 10: Illustrates an example of building a formula using expression hierarchies.
Figure 11:
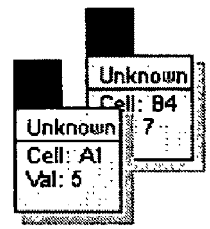
FIG. 11: Shows a sample of a compound expression hierarchy containing descendant expressions that share a similar structure.
Figure 11:
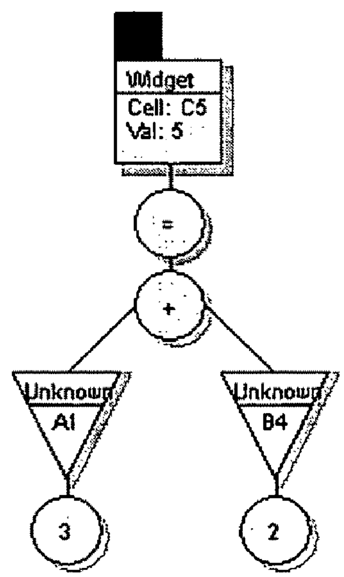
Figure 12:
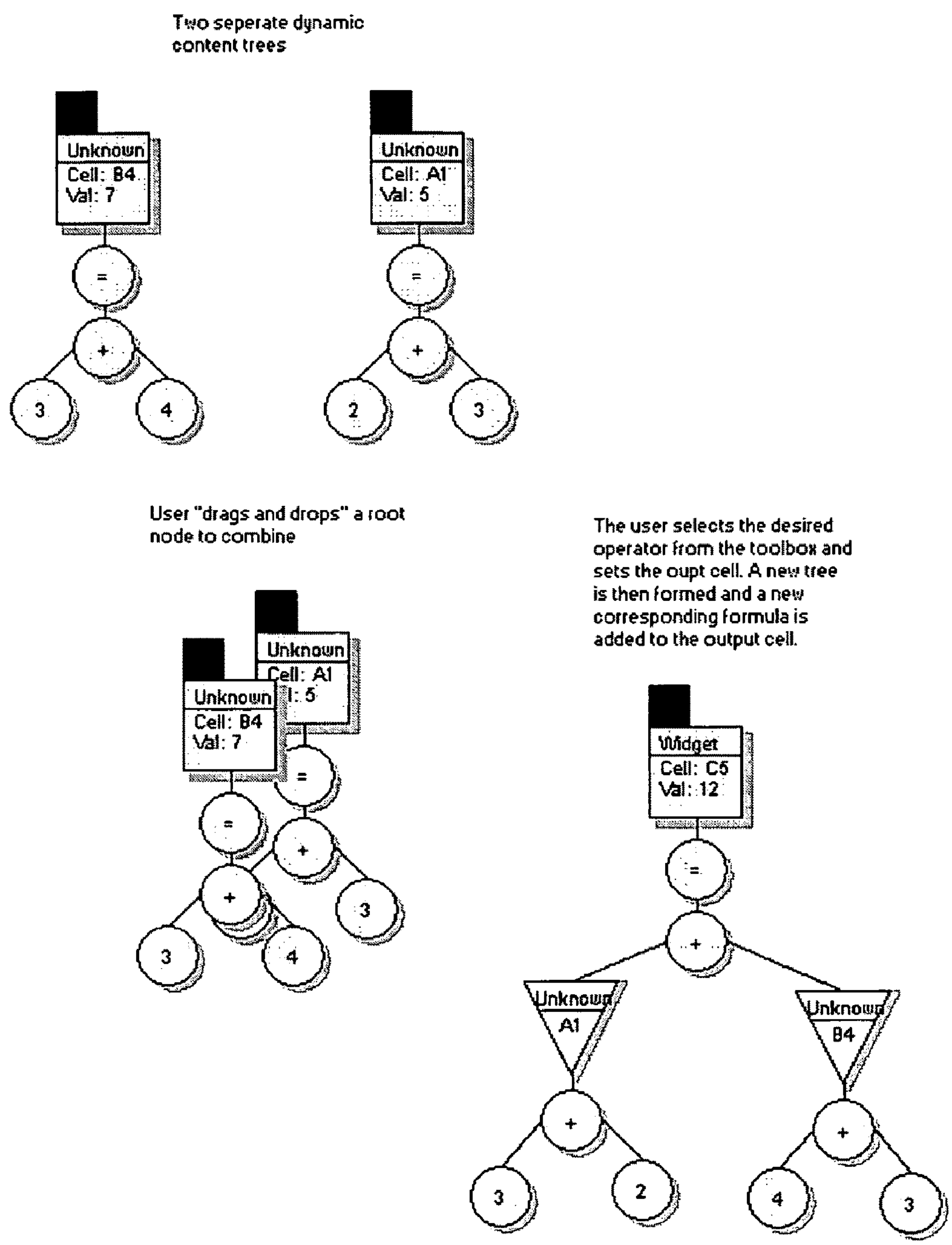
FIG. 12: Shows the expression hierarchy resulting from the compression of the expression hierarchy in FIG. 11.
Figures 13, 14:
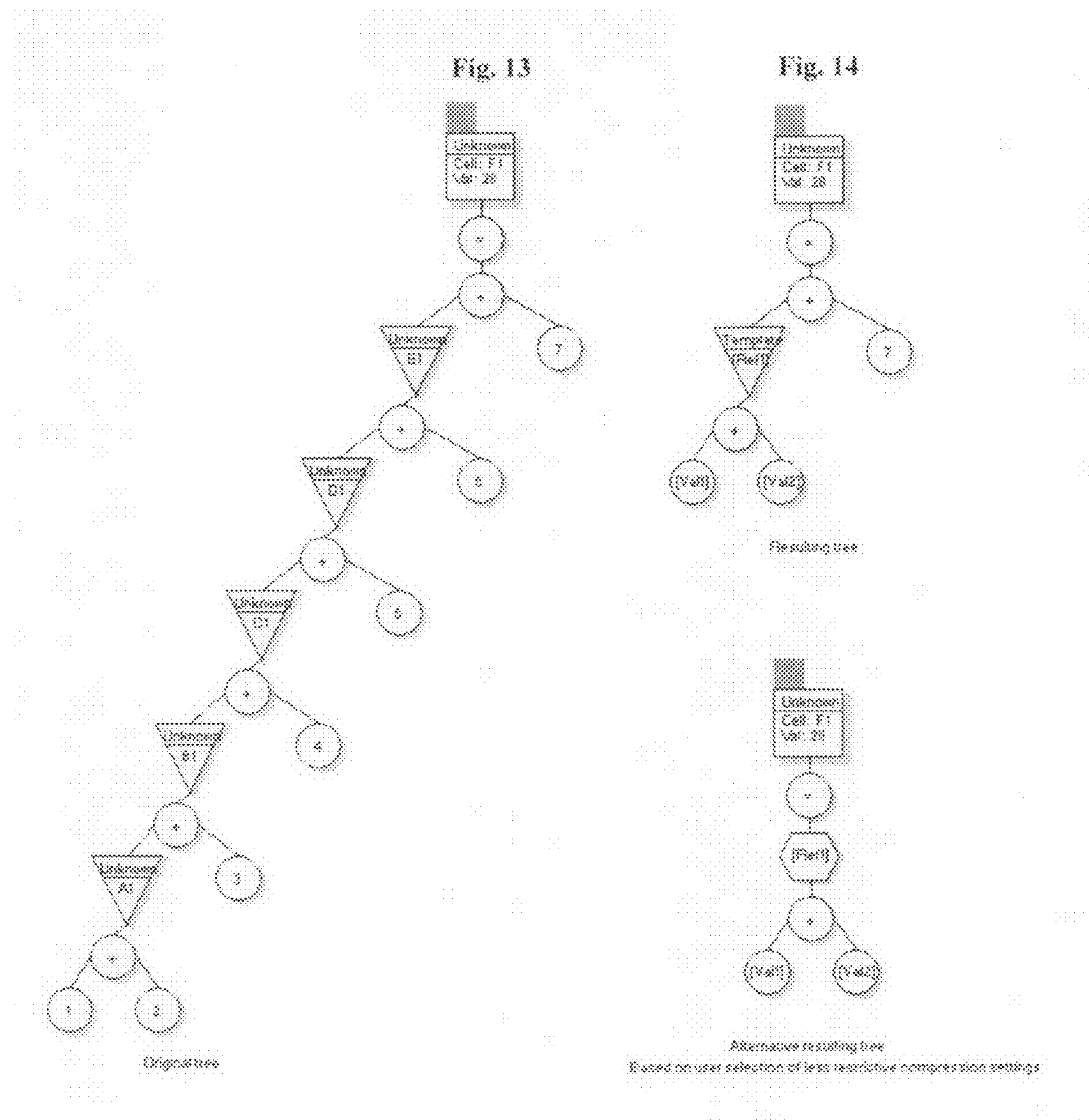
FIG. 13: Shows a sample of an expression hierarchy containing descendant expressions that share a similar structure.
FIG. 14: Shows an intermediate step of the compression process for the expression hierarchy in FIG. 13.
Figure 15:
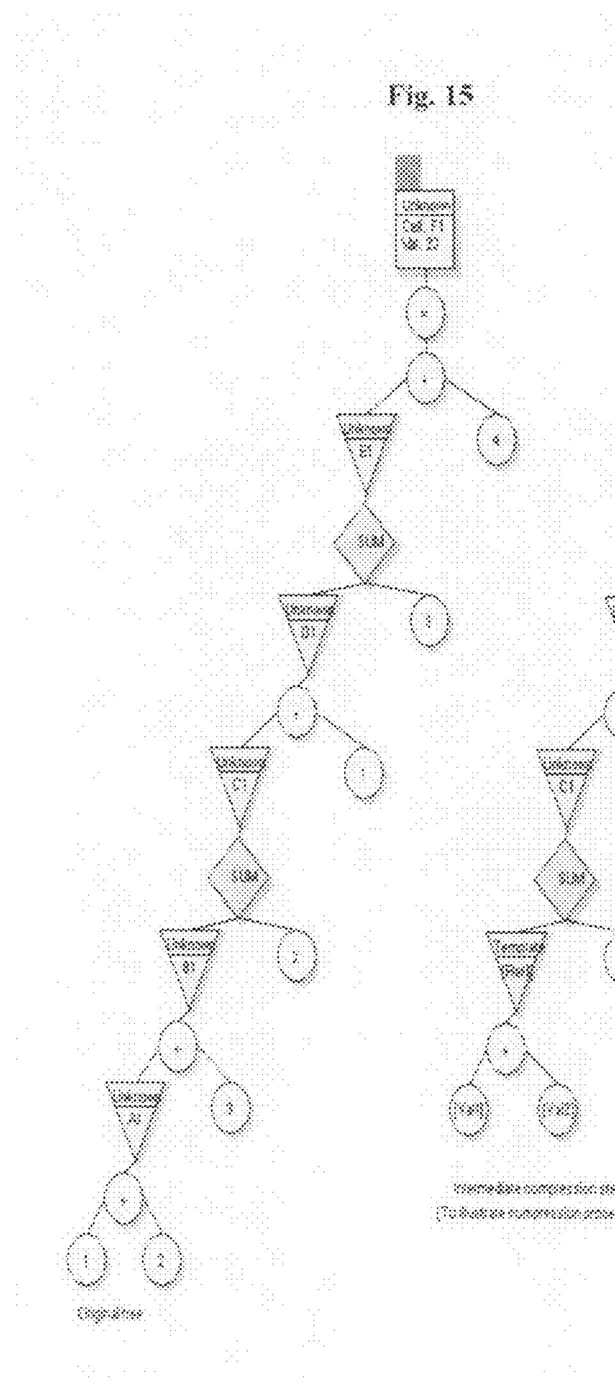
FIG. 15: Shows the expression hierarchy resulting from the compression of the expression hierarchy in FIG. 13.
Figure 16:
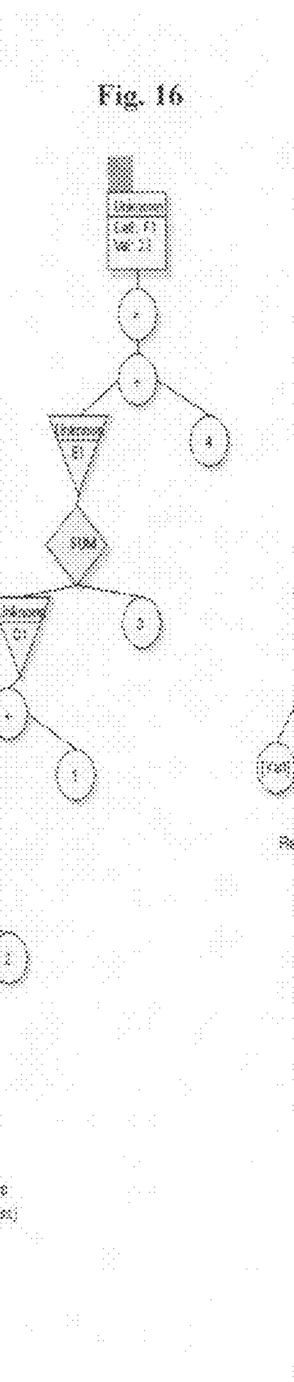
FIG. 16: Shows a sample of a compound expression hierarchy containing descendant expressions that share a similar structure.
Figure 17:
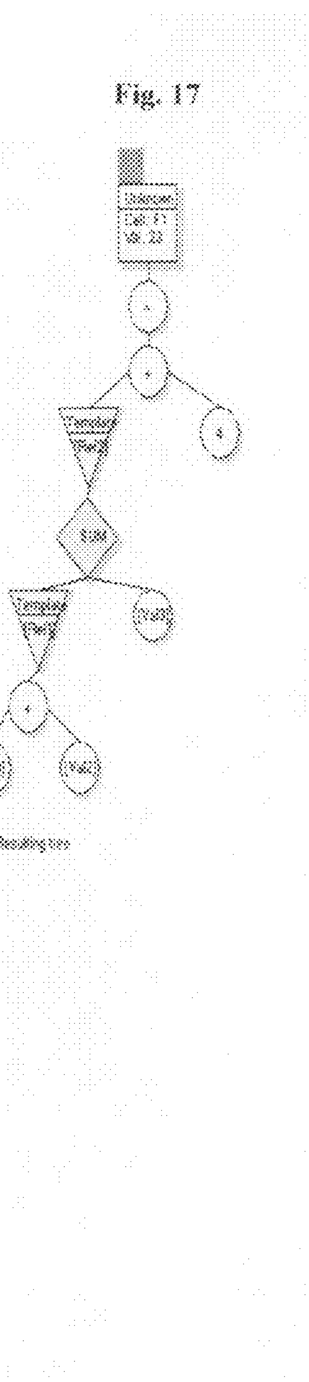
FIG. 17: Shows an intermediate step of the compression process for the compound expression hierarchy in FIG. 16.
Figures 18, 19, 20:
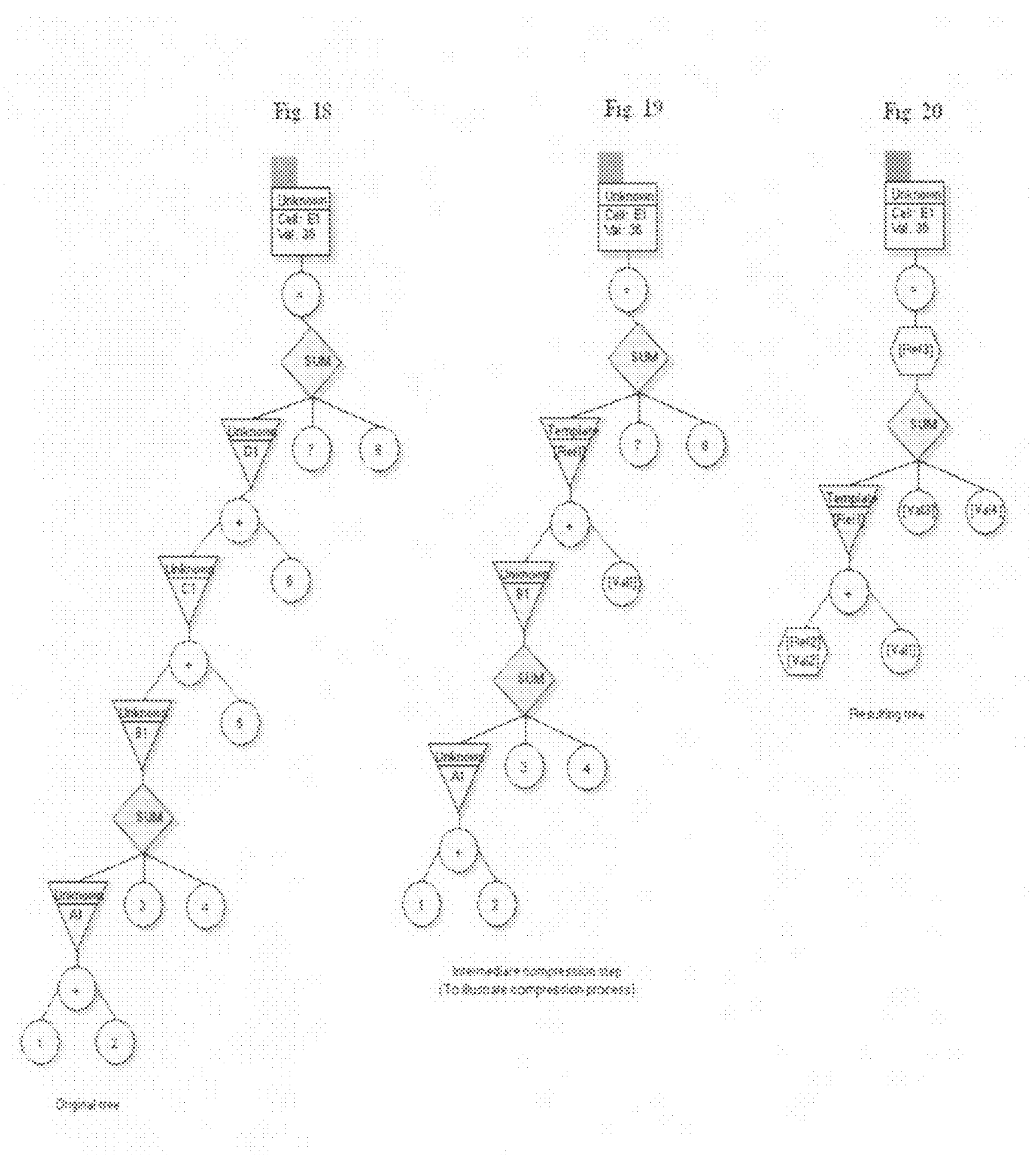
FIG. 18: Shows the expression hierarchy resulting from the compression of the compound expression hierarchy in FIG. 16.
FIG. 19: Shows a sample of a compound expression hierarchy containing descendant expressions that share a similar structure.
FIG. 20: Shows the expression hierarchy resulting from the compression of the compound expression hierarchy in FIG. 19.
Figure 21:
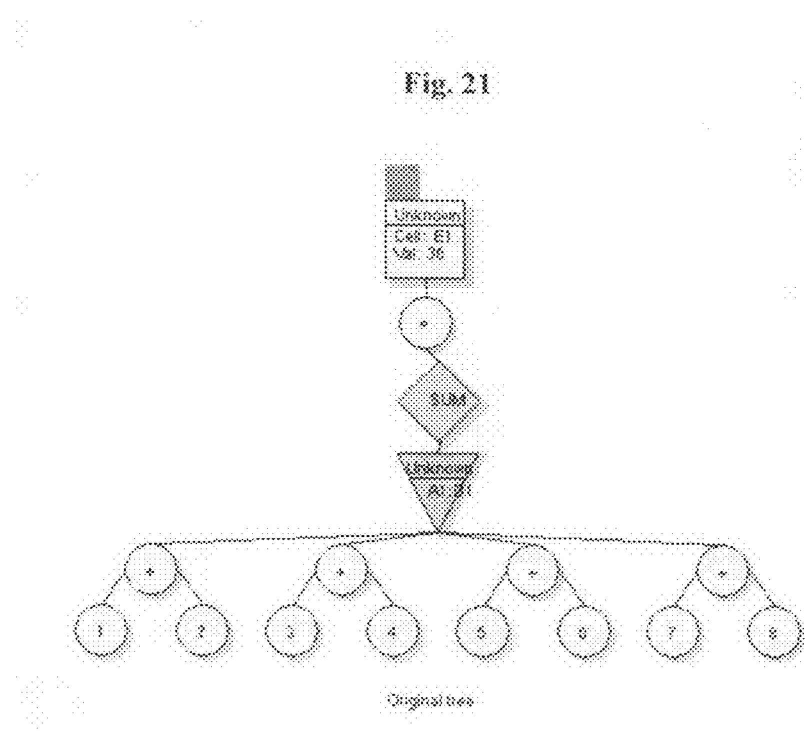
FIG. 21: Shows a sample of a compound expression hierarchy containing descendant that share a similar structure.
Figure 22:
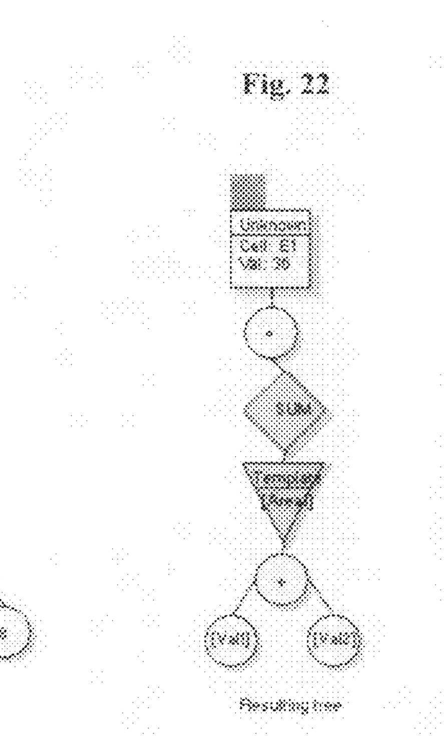
FIG. 22: Shows the expression hierarchy resulting from the compression of the compound expression hierarchy in FIG. 21.
Figures 23, 24:
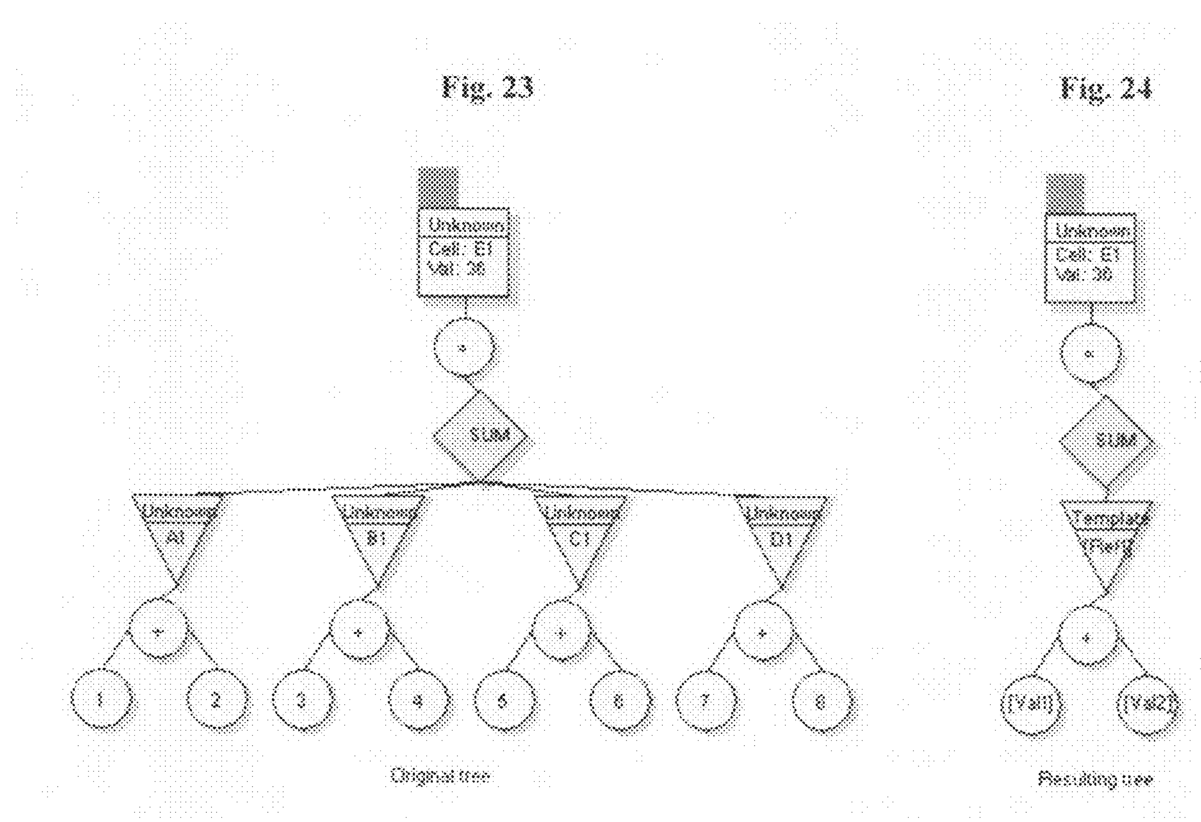
FIG. 23: Shows a sample of a compound expression hierarchy containing descendant expressions that share a similar structure.
FIG. 24: Shows the expression hierarchy resulting from the compression of the compound expression hierarchy in FIG. 23.
Figure 25:
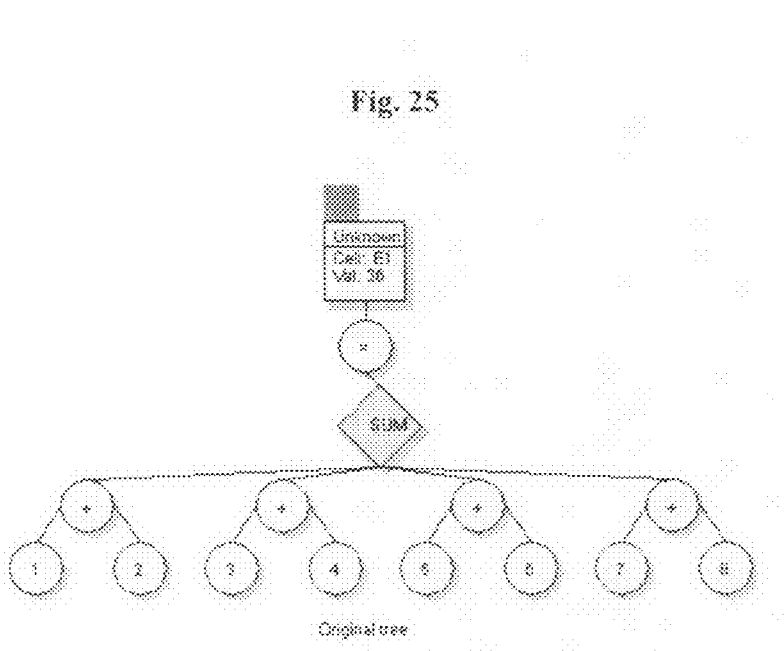
FIG. 25: Shows a sample of a expression hierarchy containing descendant expressions that share a similar structure.
Figure 26:
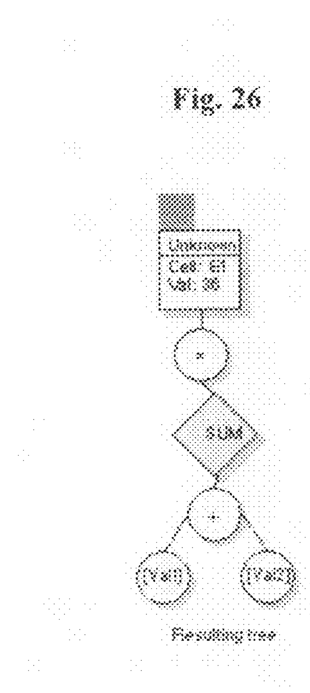
FIG. 26: Shows an intermediate step of the compression process for the compound expression hierarchy in FIG. 25.

The user interacts with the present invention through the use of a graphical user interface. This user interface provides a view for displaying a set of expression hierarchies and compound expression hierarchies concurrently within a display. The user can select to apply rules for displaying expression hierarchies within the view. For instance, the user can select whether or not to display separate individual expression hierarchies for a formula when the formula is already being represented through a descendant expression of one or more separate compound expression hierarchy. For instance, since the graphical representation of the expression hierarchies for the formulas in cells A1 and B1 in FIG. 29 already display a descendant expression representing the formula in cell C1 the user can select to hide the individual expression hierarchy for cell C1. The user may also hide or unhide the descendant expressions contained in large collections such as within an area reference node. An area reference can refer to a large group of cells. By showing or hiding the descendant expressions of an area reference node the user can establish a view which is meaningful to their current task without over crowding the display with additional information. The view may also be used to show input ranges or a combination of expression hierarchies and input ranges together. The user may move or arrange the graphical representations of expression hierarchies and input ranges using a cursor select and drag method. When dragging the graphical representation of an expression hierarchy a left mouse click and hold may be used to move a single node and a right mouse click and hold may allow the movement of the all connected nodes of an expression hierarchy in unison. The user can build or edit expression hierarchies within the view using a drag and drop style by moving one node to an overlapping position with another. The nodes can correspond to input ranges or expression hierarchies and both types are interoperable. Once two nodes are dropped into an overlapping position on the display, the user may select an operator or function from a toolbox to specify type of node used to connect the nodes. FIG. 9 shows a drag and drop build of a simple formula from input range nodes while FIG. 10 shows a similar build using dynamic content nodes. The user can also build an expression hierarchy and formula by combining input range nodes with dynamic content nodes since they are interoperable. If the selected operator or function expects additional input nodes the user can be prompted visually with new edges connected to a graphical node depicting an empty position. These empty position nodes are used as a visual aid to prompt the user for the intended data type. For instance the shape of the empty node could be consistent with the expected data type, but a separate standard color for empty position nodes may be applied. In this way the user can quickly determine what type of nodes can be inserted and identify which nodes are still empty. The user could also initiate building a new expression hierarchy by selecting a node to place in the view from the toolbox. In this case the node can be displayed with edges connected to empty nodes as a prompt for expected input. In some cases operators can accept an arbitrary number of inputs. In this case the user is free to add as many nodes as desired.

Many properties of formulas are also accessible by clicking on a specific node of an expression hierarchy's graphical representation. Once a specific node is selected a user can change cell contents, cell references, or operator of that node. Another method of managing the properties and contents of nodes consists of using a dialog box to set values and properties of the nodes. A dialog box is useful to display many properties at once in a larger font size then would fit within a node's displayed image. Information about a node may also be presented to the user when a cursor is moved over its location in a display. Such information could include the properties of the node and also a calculation of all descendant operations and operators from the position of that node in the expression hierarchy. To calculate such a value the expression hierarchy can be traversed from the point of the node in a descending manner calculating the value for each operator and operand visited. In addition, information may also be presented to the user using lists of text or images. The information in these additional views may include node names, cell locations, relative and absolute address information, formula or function errors, or calculated values. By providing an alternate method of navigating information the present invention allows the user to reduce information in the nodes and primary view to simplify the overall model and layout.

It should be noted that the descriptions provided herein represent one embodiment of the present invention. As such, other embodiments, changes, modifications to the proposed embodiment may be provided which remain within the scope and spirit of the present invention.

What is claimed is:

1. A method for creating a representational model of one or more formulas, the formulas residing in a software based spreadsheet system, the method comprising:

(a) identifying a collection of one or more sources, the sources being one or more cells located in one or more spreadsheet files or spreadsheet data residing in computer memory;

(b) identifying the formulas contained within said sources;

(c) creating a separate expression hierarchy for each formula identified in step b, the expression hierarchy comprising: a dependency graph of the formula wherein formulas are represented by nodes connected by edges, the edges forming a directed hierarchal structure representing the evaluation order of each successive reference within the dependency graph, the references being any type of spreadsheet reference including cell reference, area reference, named range, or a function with a reference type argument;

(d) creating node groups, the node groups being a set of two or more nodes grouped together as a collection, the conditions used to determine the inclusion of nodes within a node group comprising both the similarities of the operators and operands contained within the formulas being represented by the candidate nodes and the position of the candidate nodes within the expression hierarchies, the operands being considered similar when they share the same numeric or text values, the operators being considered similar when they are equal mathematical operators, equal logical operators, cell references to a cell or an equally sized range of cells, or the same function with similar operands as arguments, the position of similar candidate nodes within the expression hierarchies being compared to determine if they share a common evaluation order within their containing expression hierarchies, the node groups providing a means for two or more nodes to function as a single entity within the system;

(e) providing an interface allowing user input to perform edits of nodes and node groups, the edits including changing operator or operand types or values and removing or adding nodes from an expression hierarchy;

(f) propagating said edits across all nodes belonging to a node group when said edits are directed to a node belonging to a node group; and (g) updating the contents of the cells containing the formulas represented by the nodes in response to an edit of the nodes and edges in the expression hierarchies, and updating the nodes and edges of the expression hierarchies in response to edits of the formulas being represented by the nodes in the expression hierarchies, such that both the formulas and expression hierarchies remain functionally equivalent after edits.

2. The method of claim 1, wherein a distinct node group is created for the set of all nodes contained within two or more branches of the same expression hierarchy when each node sharing a common evaluation order within the branches is determined to be similar and the branches are also all descendants of the same node within the expression hierarchy.

3. The method of claim 1, wherein a distinct node group is created for each set of two or more contiguous nodes within a branch of the same expression hierarchy when the branch contains similar nodes having a repeating evaluation order, the repeating evaluation order being a consecutive sequence of similar nodes or two or more sets of similar nodes located at successive and equal intervals within the branch.

4. The method of claim 1, further comprising displaying a graphical rendering of one or more of said expression hierarchies concurrently within a view, the graphical rendering including text, shapes, and lines, the text including the contents of the formulas represented, by the nodes, the shapes representing the nodes, and the lines representing the edges connecting the nodes within said expression hierarchies.

5. The method of claim 4, further comprising reducing the number of said graphical renderings displayed concurrently by displaying one rendering for all nodes belonging to the same node group.

6. The method of claim 4, wherein said nodes are graphical rendered using separate physical properties including shape and color to denote different types or values of said operators or operands they represent.

7. The method of claim 1, further comprising removing any nodes from a node group when edits to the formula or expression hierarchies remove the similarities used to determine inclusion of the node in the node group.

8. The method of claim 1, wherein the properties of individual nodes belonging to the node groups are displayed through lists, the properties including the contents of the formulas and cell address of the formula represented by the individual nodes.

9. The method of claim 1, wherein a distinct node group is created for the set of all nodes contained within two or more expression hierarchies when each node sharing a common evaluation order within the expression hierarchies is determined to be similar.

10. The method of claim 1, wherein the nodes of the expression hierarchy represent the entire contents of the formulas.

11. The method of claim 1, wherein the nodes of the expression hierarchy represent individual operators and operands of the formulas, and the edges connecting the nodes representing the evaluation order thereof.

12. The method of claim 1, wherein the nodes of the expression hierarchy represent two or more individual operators and operands of the formulas, such that each subset of consecutive operators and operands that form a commutative expression within a formula are represented through a shared node, and the edges connecting the nodes representing the evaluation order thereof.

* * * * *